(12) United States Patent
Philipp et al.

(10) Patent No.: US 12,548,163 B2
(45) Date of Patent: Feb. 10, 2026

(54) QUANTIFICATION OF BODY COMPOSITION USING CONTRASTIVE LEARNING IN CT IMAGES

(71) Applicant: SIEMENS HEALTHINEERS AG, Forchheim (DE)

(72) Inventors: Lena Philipp, Achim (DE); Bogdan Georgescu, Princeton, NJ (US); Bernhard Geiger, Cranbury, NJ (US); Sasa Grbic, Plainsboro, NJ (US); Abishek Balachandran, Tamil Nadu (IN)

(73) Assignee: Siemens Healthineers AG, Forchheim (DE)

( * ) Notice: Subject to any disclaimer, the term of this patent is extended or adjusted under 35 U.S.C. 154(b) by 354 days.

(21) Appl. No.: 18/315,762

(22) Filed: May 11, 2023

(65) Prior Publication Data

US 2024/0233129 A1 Jul. 11, 2024

(30) Foreign Application Priority Data

Jan. 6, 2023 (IN) .............................. 202311001387

(51) Int. Cl.
*G06T 7/11* (2017.01)
*G06T 7/00* (2017.01)
(52) U.S. Cl.
CPC .............. *G06T 7/11* (2017.01); *G06T 7/0012* (2013.01); *G06T 2207/10081* (2013.01); *G06T 2207/20081* (2013.01); *G06T 2207/30004* (2013.01)

(58) Field of Classification Search
CPC ....... A61B 6/03; A61B 6/5241; G06T 7/0012; G06T 7/11; G06T 2207/10081; G06T 2207/20081; G06T 2207/30004
See application file for complete search history.

(56) References Cited

U.S. PATENT DOCUMENTS

| | | | |
|---|---|---|---|
| 11,922,628 B2* | 3/2024 | Zhou | G06N 3/088 |
| 2020/0090035 A1* | 3/2020 | Thathachar | G06N 3/08 |
| 2021/0183097 A1* | 6/2021 | Georgakis | G06V 20/653 |
| 2021/0265043 A1* | 8/2021 | Haghighi | G16H 50/20 |
| 2021/0326653 A1* | 10/2021 | Zhou | G06F 18/2155 |
| 2021/0397876 A1* | 12/2021 | Hemani | G06V 10/761 |
| 2022/0180126 A1* | 6/2022 | Yan | G06T 7/70 |
| 2023/0129957 A1* | 4/2023 | Udupa | A61B 6/5217 |
| | | | 382/131 |
| 2023/0410483 A1* | 12/2023 | Chen | G06V 10/82 |
| 2024/0233134 A1* | 7/2024 | Liao | G06T 7/11 |

OTHER PUBLICATIONS

Yang et al. "Quantification of muscle, bones, and fat on single slice thigh CT." Medical Imaging 2022: Image Processing. vol. 12032. SPIE, 2022. (Year: 2022).*

(Continued)

*Primary Examiner* — Katrina R Fujita (57) ABSTRACT

Systems and methods for quantification of body composition using contrastive learning in computed tomography (CT) data. A segmentation model is provided that is trained using two stages. An encoder of the segmentation model is pretrained using unlabeled data. The encoder is extended by a decoder which is further trained using labeled data.

19 Claims, 10 Drawing Sheets

(56) References Cited

OTHER PUBLICATIONS

Tang et al. "Self-supervised pre-training of swin transformers for 3d medical image analysis." Proceedings of the IEEE/CVF conference on computer vision and pattern recognition. 2022. (Year: 2022).*

Wu et al. "Dual contrastive learning with anatomical auxiliary supervision for few-shot medical image segmentation." European Conference on Computer Vision. Cham: Springer Nature Switzerland, 2022. (Year: 2022).*

Wu et al. "Federated self-supervised contrastive learning and masked autoencoder for dermatological disease diagnosis." arXiv preprint arXiv:2208.11278 (2022). (Year: 2022).*

Ghesu, Florin-Cristian, et al. "Multi-scale deep reinforcement learning for real-time 3D-landmark detection in CT scans." IEEE transactions on pattern analysis and machine intelligence 41.1 (2017): 176-189.

* cited by examiner

QUANTIFICATION OF BODY COMPOSITION USING CONTRASTIVE LEARNING IN CT IMAGES

CROSS REFERENCE TO RELATED APPLICATIONS

This patent document claims the benefit of the filing date of IN 202311001387 filed on Jan. 6, 2023, which is hereby incorporated in its entirety by reference.

FIELD

This disclosure relates to machine learning applications such as used in medical imaging.

BACKGROUND

Artificial intelligence (AI) is a crucial component that is used for various medical procedures such as medical imaging applications and allows for precision medicine and an improved patient experience. The use of AI helps automate and standardize not only workflows but also complex diagnostics. AI is a computer-aided process for solving complex problems that are usually reserved for humans. Some examples are machine vision, pattern recognition, speech recognition, and knowledge-based decision-making. Machine learning is a specific type of AI that uses models that are trained and improved by continuously inputting high volumes of data allowing the models to keep improving their performance expectations. Machine learning enables the model to adapt to new circumstances and to detect and extrapolate patterns. Deep (machine) learning is a type of machine learning that, for example, uses multilayer neural networks with multiple hidden layers between the input and output layers. These models/networks may identify relationships that may not have been recognized using traditional techniques.

In order to make accurate predictions or classifications, machine learning models leverage vast amounts of data and processing power. For example, in supervised training, machine learning models are configured using sample data, known as training data, in order to make these predictions or decisions by repeatedly inputting the training data and comparing the output of the model to an expected output. Through the processes of, for example, gradient descent and backpropagation, machine learning models are adjusted over and over until the model is capable of making predictions about new inputs with an acceptable level of precision. Once trained to this acceptable level, a model may be deployed for use in a clinical environment.

There are costs involved when training machine learning models for medical imaging applications. Despite that machine learning is capable of excellent performance for medical image segmentation, its success relies on a large set of examples of the problem-related area and the corresponding densely annotated masks that are expensive and time consuming to acquire. For example, in medical image segmentation, annotated datasets lacking in quality or size are a common challenge. A large collection of annotated data is needed to ensure representativeness by capturing different variants of the problem the model is supposed to solve. If the size of the training dataset is too small compared to the model's complexity, the model may overfit the data and be unable to generalize to unseen data.

In an example, body composition measurements are not used in clinical practice due to the large amount of manual labor needed to perform them. Most of the segmentation algorithms do not offer high performance, requiring still a significant amount of manual work to correct the results. This is often due to either not using supervised segmentation algorithms (e.g., Graph Cuts, region growing algorithms or Random Walker) or the supervised segmentation algorithms do not perform well as the amount of training data used is too small (as manual labeling effort is too high to justify labeling 100+ images).

SUMMARY

By way of introduction, the preferred embodiments described below include methods, systems, instructions, and computer readable media for quantification of body composition using contrastive learning in computed tomography (CT) data. The proposed embodiments may reduce the required amount of labeled data needed to achieve good segmentation performance.

In a first aspect, a method for training a segmentation model, the method comprising: acquiring a plurality of unlabeled CT data and a plurality of labeled CT data; extracting a plurality of patches taken from same positions across different images of the plurality of unlabeled CT data; pre training an encoder network of the segmentation model using a contrastive loss and the plurality of patches; extending the segmentation model to include a decoder network; training the segmentation model using fully supervised training with labeled CT data, wherein the pre trained encoder weights of the segmentation model are frozen; and storing the trained segmentation model for a medical segmentation task.

In an embodiment, the unlabeled CT data and labeled CT data comprise 3D volume data. The amount of labeled CT data may be smaller than the unlabeled CT data. Extracting the plurality of patches may include at least aligning and cropping the unlabeled CT data using a deep reinforcement learning based landmark detection method. The patches comprise non-overlapping sections of the unlabeled CT data with unique locations. The contrastive loss may distinguish patches of the plurality of patches from different positions.

In an embodiment, the labeled CT data comprises body composition labels. The segmentation model may be trained to segment and classify at least muscle, subcutaneous, intramuscular, and visceral fat tissue.

In an embodiment, the segmentation model comprises a U-net architecture comprising at least the encoder network and the decoder network.

In a second aspect, a system for segmentation includes a CT imaging device, a memory, a processor, and a display. The CT imaging device us configured to acquire CT data of a patient. The memory is configured to store a segmentation model comprising an encoder network and a decoder network, wherein weights for the encoder network are pre-trained using a contrastive loss and unlabeled CT data, wherein weights for the decoder network are learned by training the segmentation model using labeled data, wherein during training of the segmentation model, the encoder network weights are frozen. The processor is configured to apply the segmentation model to the CT data of the patient to output a segmented mask. The display is configured to display the segmented mask.

The unlabeled CT data and labeled CT data may comprise 3D volume data. The amount of labeled CT data may be smaller than the unlabeled CT data. The labeled CT data may comprise body composition labels. The segmentation model may be trained to segment and classify at least muscle, subcutaneous, intramuscular, and visceral fat tissue.

In an embodiment, pretraining of the encoder network comprises extracting a plurality of patches from the unlabeled CT data by aligning and cropping the unlabeled CT data using a deep reinforcement learning based landmark detection method, wherein pairs of the plurality of patches are input into the encoder network to generate the contrastive loss.

In a third aspect, a method for quantification of body composition, the method comprising: acquiring CT data of a patient; inputting the CT data into a segmentation model that is configured to segment input CT data, wherein the segmentation model comprises an encoder network and a decoder network, wherein weights for the encoder network are pretrained using a contrastive loss and unlabeled CT data, wherein weights for the decoder network are learned by training the segmentation model using labeled data, wherein during training of the segmentation model, the encoder network weights are frozen; outputting a segmented image of the CT data; and diagnosis a medical condition for the patient based on the segmented image.

The unlabeled CT data and labeled CT data may comprise 3D volume data. The segmentation model may comprise a U-net architecture comprising at least the encoder network and the decoder network. In an embodiment, pretraining of the encoder network comprises extracting a plurality of patches from the unlabeled CT data by aligning and cropping the unlabeled CT data using a deep reinforcement learning based landmark detection method, wherein pairs of the plurality of patches are input into the encoder network to generate the contrastive loss. The plurality of patches may comprise non-overlapping sections of the unlabeled CT data with unique locations.

Any one or more of the aspects described above may be used alone or in combination. These and other aspects, features and advantages will become apparent from the following detailed description of preferred embodiments, which is to be read in connection with the accompanying drawings. The present invention is defined by the following claims, and nothing in this section should be taken as a limitation on those claims. Further aspects and advantages of the invention are discussed below in conjunction with the preferred embodiments and may be later claimed independently or in combination.

DETAILED DESCRIPTION

Embodiments described herein provide systems and methods that use contrastive learning to improve the performance of models to segment and quantify medical imaging data automatically. The contrastive learning approach reduces the required amount of labeled data needed to achieve a good segmentation performance. In the first stage, global information about anatomical structures is extracted from unlabeled CT images. An alignment and patch extraction strategy is used to prepare the self-supervised training process. Patches are taken from the same position across different volumes. An encoder network of a model is trained using contrastive loss to distinguish patches from different locations. One advantage is that the training does not require any labeled CT data and therefore the encoder network may be trained on thousands of examples with minimum effort. In a second stage, the encoder network is extended by a decoder and the model is trained fully supervised using labeled CT scans. By transferring the extracted information from the pretraining to a downstream task, the model performs better with less data compared to a randomly initialized model. One area that the model may be applicable to is automatically measuring body composition.

Body composition, defined as the amount and distribution of fat and muscle in the body, is linked to clinical outcomes in a number of conditions and thus is very useful. Obesity (BMI>30 kg/m2) is a risk factor in and of itself historically. Among others, obesity has been associated with different cardiovascular risk factors (like type 2 diabetes mellitus, insulin resistance, increased blood pressure, and various CV diseases (coronary heart disease, sudden cardiac death, heart failure, atrial fibrillation). Moreover, "excess body fatness" has been linked with sufficient evidence to various cancer types (such as renal cell, colon, rectum, ovary, liver, breast. Nevertheless, the BMI is fundamentally constrained by its inability to distinguish between fat mass and lean body mass because it primarily measures total body weight in relation to height. In addition, BMI does not consider the heterogeneity of fat depots. Several studies challenge the usefulness of BMI in studying health risk factors and especially regarding survival in cancer patients. A growing number of studies show that body composition can offer crucial prognostic information. Using CT scans to assess body composition allows the distinction between muscle and fat and the differentiation of the various fat compartments into visceral, subcutaneous, and inter/intramuscular adipose tissue. In order to quantify the tissues, a trained rater needs to manually annotate the different tissues. Since this task is time-consuming, a single slice is evaluated as a trade-off between cost and accuracy. It takes about 20-30 minutes to annotate one slice using HU thresholds. A commonly used slice is extracted at the height of the middle of the third lumbar vertebra. Tissue areas from this slice relate to the entire volume. This slice is used, among others, in studying the associations between body composition measurements and outcomes in inflammatory bowel disease, breast cancer, chemotherapy toxicity, and sarcopenia. More accurate quantification can be approximated by using 3D instead of single-slice measurements. Beyond that, individual body composition profiles can be investigated, allowing the variability of body composition compartments across the body and between individuals to be represented. As for many different problems in the field of medical imaging, AI and deep learning is used to assist with segmenting body composition.

Measuring body composition accurately may be challenging, as it involves separating the various tissues and substances in the body. With unlimited resources, CT scans may be used to provide accurate and precise body composition measurements. Using CT scans to assess body composition allows the distinction between muscle and fat and the differentiation of the various fat compartments into visceral, subcutaneous, and inter/intramuscular adipose tissue. A CT image is produced by rotating a narrow beam of x-rays around a patient's body. The signal is used to generate cross-sectional grayscale images by employing the attenuation coefficient of radiation within a tissue. By stacking these images together, a 3D image is created. However, body composition quantification is not routinely calculated using CT scans as it requires laborious segmentation (tracing) of compartments and tissues. The task may be more laborious as multiple segmented slices or images are required to generate a single 3D image or volume.

Figure 1:
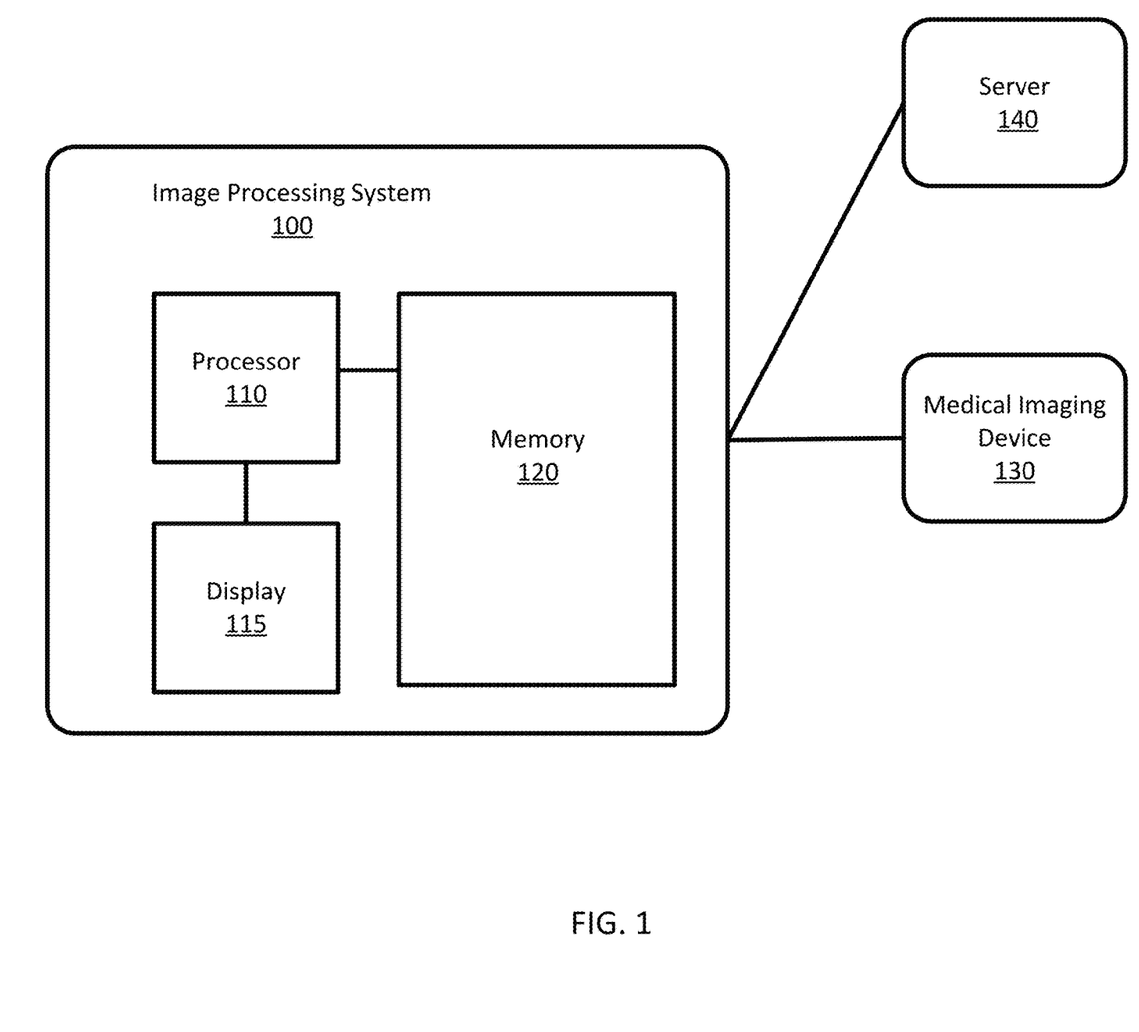
FIG. 1 depicts an embodiment of a system for segmentation of medical imaging data.

Embodiments provide systems and methods that reduce the amount of annotations required by providing pretraining of a component of a segmentation model. FIG. 1 depicts an example system for quantification of body composition using contrastive learning in CT images. The system includes an imaging processing system 100, a medical imaging device 130, and optionally a server 140. The server 140 may be configured to perform any of the tasks of the image processing system 110 including processing and/or storing of the data and models. The imaging processing system 100 includes a processor 110, a memory 120, and a display 115. The imaging processing system 100 may be included with or coupled to the medical imaging device 130. Certain imaging functions may be performed by any of the imaging processing system 100, the medical imaging device 130, or the server. The imaging processing system 100 may be configured to train or store a machine learned model that is used for segmenting imaging data provided by the medical imaging device 130. Imaging data may be acquired from the medical imaging device 130 in real time or may be generated, stored, and processed at a later time.

Figure 2:
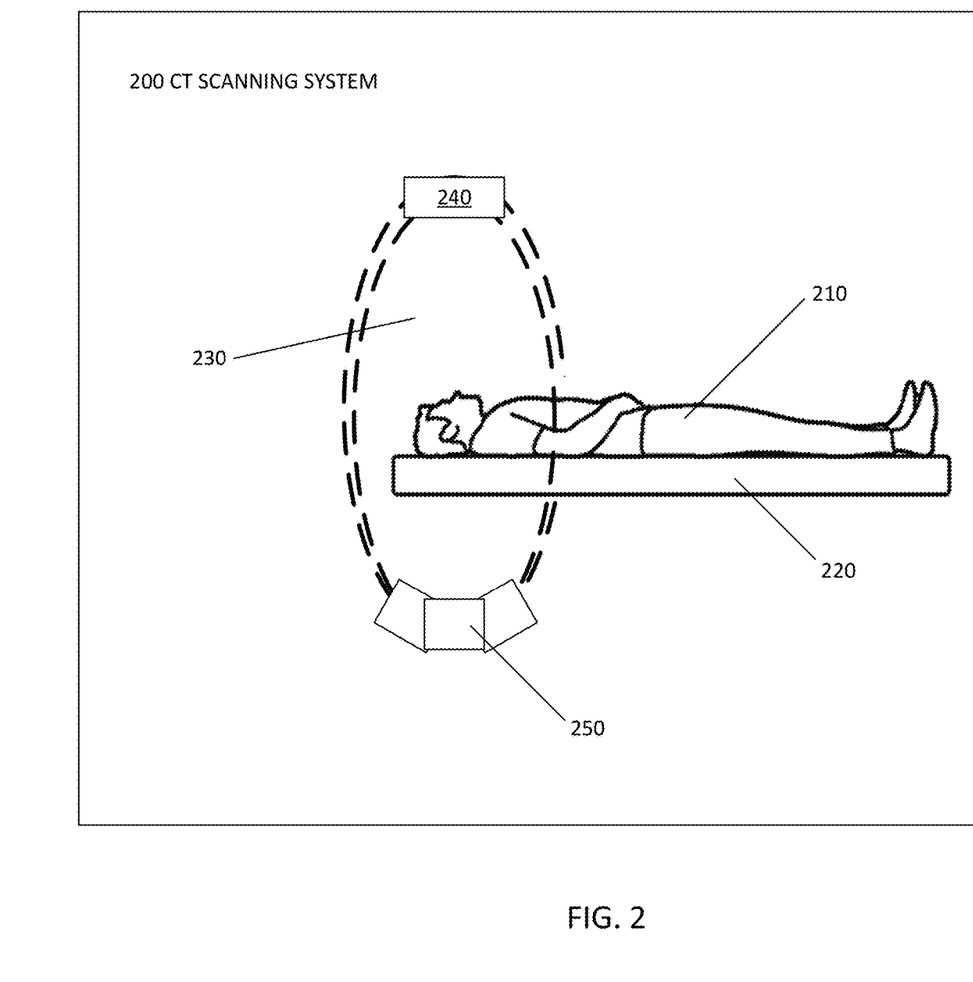
FIG. 2 depicts an example CT imaging system.

For the medical imaging device 130, one example used herein is in a CT (computed tomography) context (i.e., a CT scanner), but other types of scanners may be used (e.g., MR, PET, SPECT, or other medical imaging devices). The CT scanning device is only exemplary, and a variety of CT scanning systems can be used to collect the CT data. FIG. 2 depicts an example CT imaging system 200. An object 210 (e.g., a patient 210) is positioned on a table 220 that is configured, via a motorized system, to move the table 220 to multiple positions through a circular opening 230 in the CT imaging system 200. An X-ray source 240 (or other radiation source) and detector element(s) 250 are a part of the CT imaging system 200 and are configured to rotate around the subject 210 on a gantry while the subject is inside the opening/bore 230. The rotation may be combined with movement of the bed to scan along a longitudinal extent of the patient 210. Alternatively, the gantry moves the source 240 and detector 250 in a helical path about the patient 210. In a CT imaging system 200, a single rotation may take approximately one second or less. During the rotation of the X-ray source 240 and/or detector, the X-ray source 240 produces a narrow, fan-shaped (or cone-shaped) beam of X-rays that pass through a targeted section of the body of the subject 210 being imaged. The detector element(s) 250 (e.g., multi-ring detector elements) are opposite the X-ray source 240 and register the X-rays that pass through the body of the subject being imaged and, in that process, record a snapshot used to create an image. Many different snapshots at many angles through the subject are collected through one or more rotations of the X-ray source 240 and/or detector element(s) 250. The image data generated by the collected snapshots are transmitted to the image processing system 100 that stores or processes the image data based on the snapshots into one or several cross-sectional images or volumes of an interior of the body (e.g., internal organs or tissues) of the subject being scanned by the CT imaging system 200. Any now known or later developed CT system may be used. Other x-ray scanners, such as a CT-like C-arm scanner, may be used.

In another example, the medical imaging device 130 is a PET system. The PET system is a nuclear imaging system. The detectors detect gamma rays emitted indirectly by a positron-emitting tracer. Pairs of gamma rays generated by the same positron annihilation event may be detected using the ring of the detectors. The pairs of gamma rays travel about 180 degrees apart. If the direction of travel intersects the arrangement of detectors at two locations, a coincident pair may be detected. To distinguish specific pairs, the coincidence of detected gamma rays is determined. The timing of receipt is used to pair the detected gamma rays. The timing, as prompt data, may also indicate the time of flight (TOF), providing information about where along a line of response the emission occurred. Each individual detection output from the detectors includes energy, position, and timing information. Alternatively, the detectors output energy information and a receiving coincidence processor determines the timing and position (e.g., based on port assignment or connections). The timing information is used to determine coincidence of detection by different detectors by the coincidence processors with or without also determining a general position along the LOR of the emission based on TOF. Pairs of gamma rays associated with the same positron emission are determined. Based on the detected event, a LOR is determined from the detectors involved in the detection of that event. The detected events are passed to the memory 120 and/or processor 110.

The medical imaging device 130 is configured to generate imaging data or medical images of a subject. The imaging data or the medical image is data representing a two-dimensional slice or a three-dimensional volume of the subject. The data may be in any format. While the terms image and imaging are used, the image or imaging data may be in a format prior to actual display of the image. For example, the medical imaging data may be a plurality of scalar values representing different locations in a Cartesian or polar coordinate format different than a display format. As another example, the medical image may be a plurality of red, green, blue (e.g., RGB) values output to a display 115 for generating the image in the display format. The medical image may be currently or previously displayed image in the display or another format. The imaging data is a dataset that may be used for imaging, such as scan data or a generated image representing a portion of the patient.

The medical imaging data represents a two or three-dimensional region of the subject. For example, the medical imaging data represents an area or slice of the subject as pixel values. As another example, the medical imaging data represents a volume or three-dimensional distribution of voxels. The three-dimensional representation may be formatted as a stack or plurality of two-dimensional planes or slices. Values are provided for each of multiple locations distributed in two or three dimensions. The medical imaging data is acquired as one or more frames of data. The frame of data represents the scan region at a given time or period. The dataset may represent the area or volume over time, such as providing a 4D representation of the subject.

The medical imaging data or medical image is processed by the image processing system 100. The image processing system 100 includes a processor 110, display 115, and memory 120. The image processing system 100 may receive or transmit data to and from the server 140 that may also be configured to process the image or store data for future image processing or training/storage of machine trained models. The image processing system 100 inputs the CT data and outputs a segmented image or volume.

The processor 110 is a general processor, digital signal processor, graphics processing unit, application specific integrated circuit, field programmable gate array, artificial intelligence processor, digital circuit, analog circuit, combinations thereof, or other now known or later developed device for processing images, normalizing image data, registering image data, augmenting image data, among other steps described below. The processor 110 is a single device, a plurality of devices, or a network. For more than one device, parallel or sequential division of processing may be used. Different devices making up the processor 110 may perform different functions. In one embodiment, the processor 110 is a control processor or other processor of the medical imaging device 130. In other embodiments, the processor 110 is part of a separate workstation or computer. The processor 110 operates pursuant to stored instructions to perform various acts described herein. The processor 110 is configured by software, design, firmware, and/or hardware to perform any or all of the acts of FIGS. 4 and 10.

Figure 3:
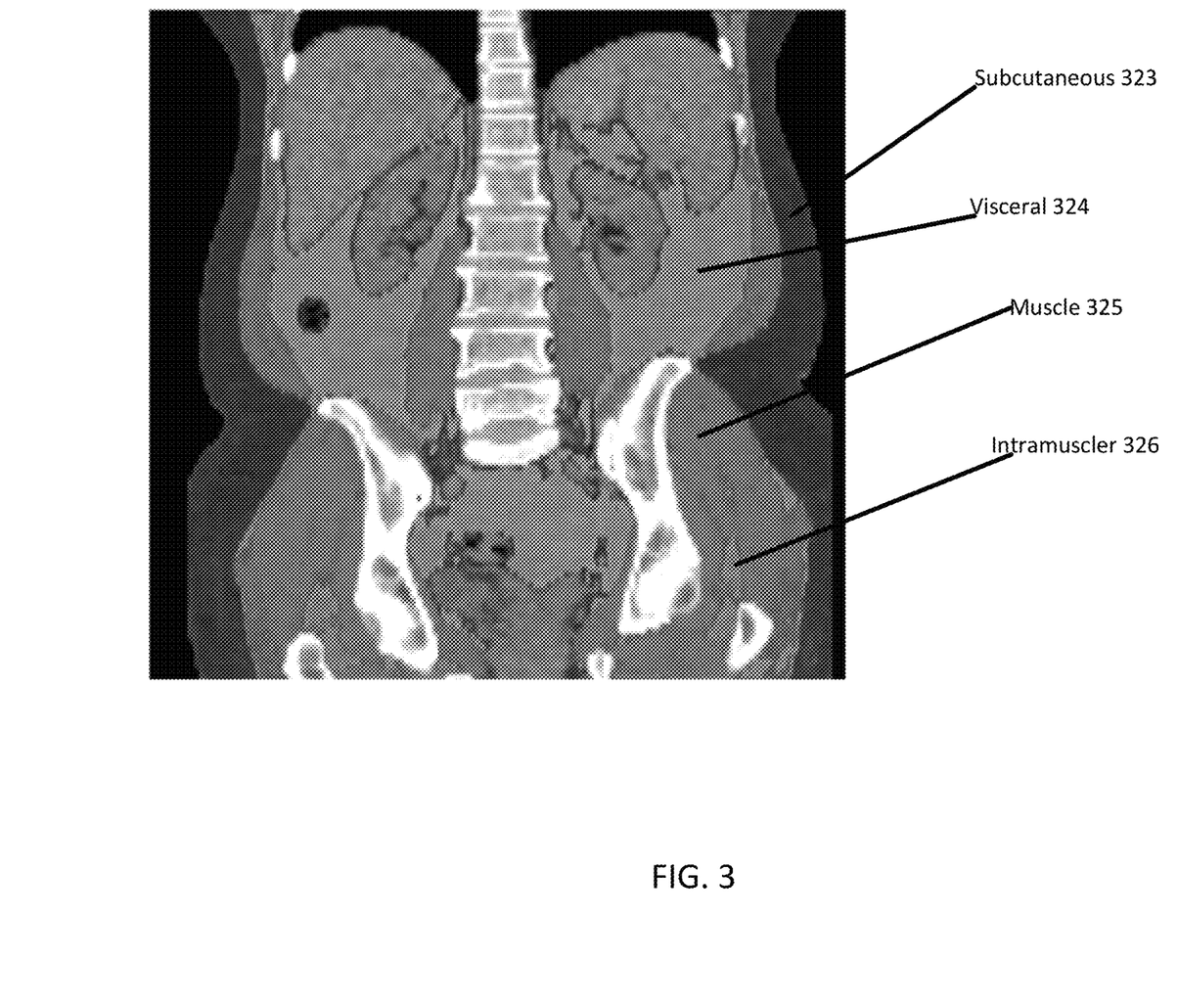
FIG. 3 depicts an example of a segmented image.

In an embodiment, the processor 110 is configured for segmentation using a machine trained model. The processor 110 is configured to segment the image data provided by the medical imaging device 130. Image segmentation extracts or identifies regions of interest (ROI) through a semiautomatic or automatic process. Segmentation divides an image into areas based on a specified description, such as segmenting body organs/tissues (skin, bone, muscle, abdominal visceral fat (AVF), subcutaneous fat (SF), internal organs and vessels (IO), and central nervous system (CNS)) in the medical applications for border detection, tumor detection/segmentation, and mass detection. FIG. 3 depicts an example of a segmented abdominal portion of a patient. The tissues and organs are outlined in the underlying CT image and provided with different colors or shades of grey to distinguish between types. FIG. 3 includes muscle 323, subcutaneous 324, intramuscular 325, and visceral fat tissue 326. The segmented image may be used to quantify the body composition of the patient and/or provide additional information for a medical diagnosis or procedure. The segmentation may be provided by a segmentation model and the output of the medical imaging device 130. Different types of models or networks may be trained and used for the segmentation task.

In an embodiment, the machine learned network(s) or model(s) include a neural network that is defined as a plurality of sequential feature units or layers. Sequential is used to indicate the general flow of output feature values from one layer to input to a next layer. Sequential is used to indicate the general flow of output feature values from one layer to input to a next layer. The information from the next layer is fed to the next layer, and so on until the final output. The layers may only feed forward or may be bi-directional, including some feedback to a previous layer. The nodes of each layer or unit may connect with all or only a sub-set of nodes of a previous and/or subsequent layer or unit. Skip connections may be used, such as a layer outputting to the sequentially next layer as well as other layers. Rather than pre-programming the features and trying to relate the features to attributes, the deep architecture is defined to learn the features at different levels of abstraction based on the input data. The features are learned to reconstruct lower-level features (i.e., features at a more abstract or compressed level). Each node of the unit represents a feature. Different units are provided for learning different features. Various units or layers may be used, such as convolutional, pooling (e.g., max pooling), deconvolutional, fully connected, or other types of layers. Within a unit or layer, any number of nodes is provided. For example, 100 nodes are provided. Later or subsequent units may have more, fewer, or the same number of nodes.

The processor 110 is configured to train the model using a machine training method described below and training data. The training data may be acquired at any point prior to inputting the training data into the model. For training and applying a machine trained model there are two stages, a training stage for generating or training the model using a collection of training data and an application stage for applying the generated/trained entity matching network to new unseen (unlabeled) data. The training stage includes acquiring training data during patient scans, processing the training data, and inputting the training data into the model in order to generate a trained model. The output is a trained model that is applied in the application stage. The application stage includes receiving real-time data during a CT scan, applying the trained model that was trained during the training stage. The training stage may be performed at any point prior to the application stage. The training stage may be repeated after new training data is acquired. The application stage may be performed at any point after the training stage generates the trained network and real-time data is received.

Figure 4:
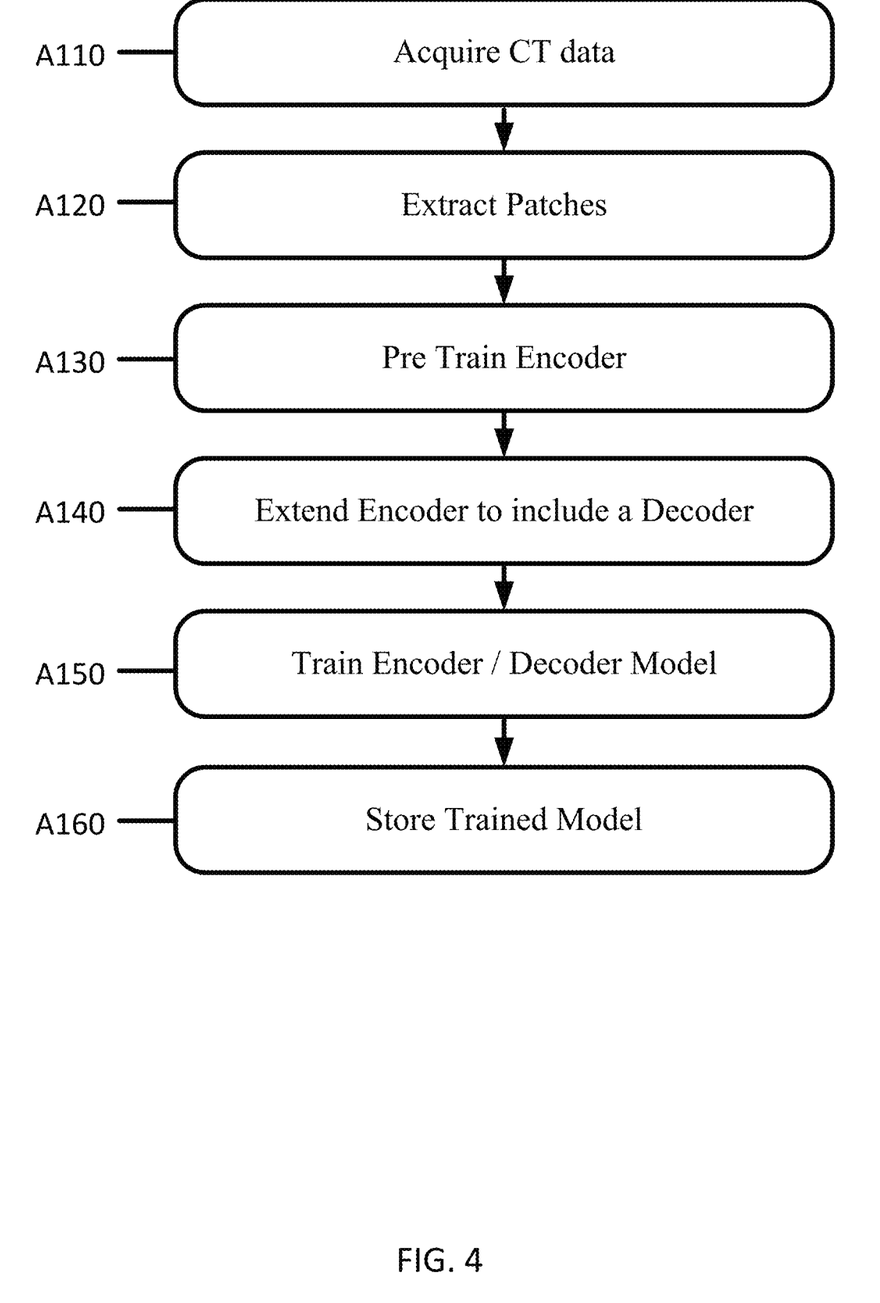
FIG. 4 depicts an example method for quantification of body composition using contrastive learning according to an embodiment.

FIG. 4 depicts an example method for training a machine learned model for segmentation task according to an embodiment. As described further below, labeled and unlabeled CT data is acquired. Patches are extracted from the unlabeled data and used to train an encoder with a contrastive loss. The labeled data is used to train a segmentation model that includes the trained encoder and a decoder. The pretraining of the encoder may provide for the entire segmentation model to require fewer labeled data than otherwise required to provide an acceptable output. The method is performed by the system 100 of FIGS. 1, 2, or another system 100. The method is performed in the order shown or other orders. Additional, different, or fewer acts may be provided.

At act A110, the system 100 acquires a set of unlabeled CT data and a set of labeled CT data. The unlabeled dataset is used for pre-training a network in act A120 and A130 described below. The labeled dataset is used for training the body composition model in act A150. The images in the unlabeled datasets need to be registered or aligned to extract similar content across volumes. The contrastive learning mechanism described below works by identifying how similar pairs of image patches are. As such, the patches must be extracted so that the patches depict similar areas.

In an embodiment, a landmark detection model may be used to find and align image data that includes the relevant area covering the desired area. In an example, the desired areas may include the abdomen and pelvis. In this example, using the landmark detection model, the positions of vertebral bodies in different images/volumes may be automatically determined. The positions may be used to crop and align the images/volumes. In this example, only scans showing both T8 and the coccyx may be included and aligned. After the scans are registered/aligned, the volumes may be separated by sex and randomly paired together within their group. In an embodiment, a segmentation model may be used to crop the images to a similar region and resize them to the average image size of the dataset used. Any landmark detection model or other model that can identify global information in the medical images may be used to align or register the images. In an example, a model uses deep reinforcement learning with multi-scale image analysis to enable an artificial agent to systematically learn optimal strategies for finding anatomical structures. The artificial agent is trained not only to distinguish the target anatomical object from the rest of the body but also how to find the object by learning and following an optimal navigation path to the target object in the imaged volumetric space. Other automatic registration or alignment methods may be used.

At act A120, the system 100 extracts a plurality of patches taken from the same position across different images of the plurality of CT data. Each patch is a section of an image of the unlabeled CT data. In an embodiment, a grid may be used to extract patches across scans. The grid splits up each image into a similar number of patches. For extracting patches, the grid guarantees that patches do not overlap and that every batch consists of patches from unique locations. A patch generator extracted n nonoverlapping patches pairs according to their coordinates. N patches are extracted per volume. n×2 patches are extracted per volume pair. However, patch pairs may be excluded if the voxel sum is below a certain threshold to avoid adding patches that only show the background. This has been identified as a source of error, particularly for smaller patch sizes, since this increases the likelihood of adding multiple patches showing background only into one batch.

Figure 5:
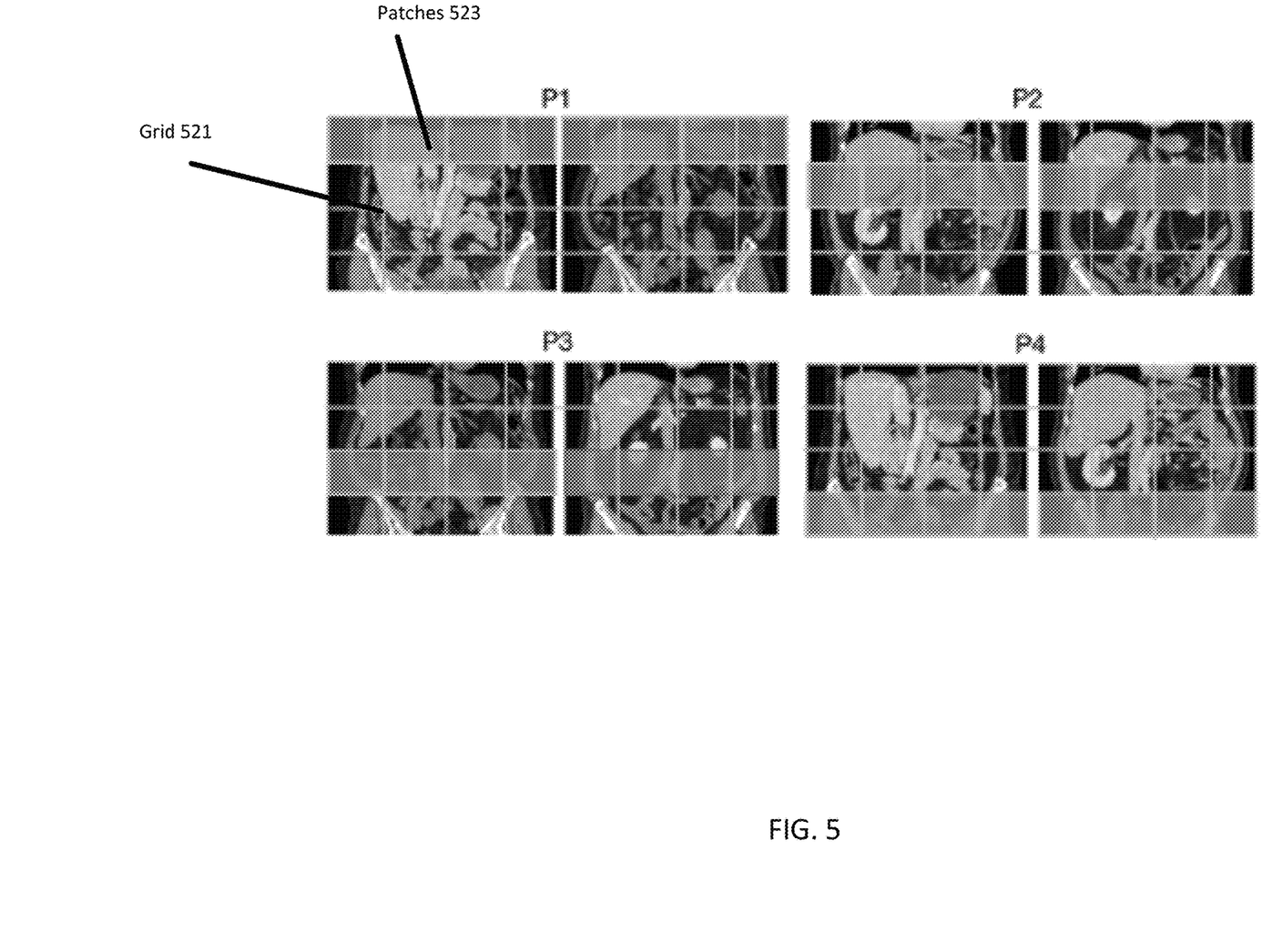
FIG. 5 depicts an example of patch extraction according to an embodiment.

In an embodiment patches are extracted across pairs of scans (P1, P2, P3, P4) to capture similar anatomical content. FIG. 5 shows examples of patch pairs extracted from different locations. A grid (white lines 521) is used to extract patches across scans. For scans belonging to the same pair (P1, P2, P3, P4), a fixed number of patches are selected (shaded squares 523) from the same position. Different patch locations are used between pairs. In this example, the location of patches between pairs differs in y-coordinate.

From each pair, patches are extracted from similar locations between the two volumes. In each epoch, a subset of m volume pairs is selected. The parameter m is based on how many patches are extracted per pair and on the number of available unique patch locations n. In the example shown in FIG. 5, m corresponds to the value 4, since 4 patch pairs are extracted from 16 unique patch locations. The patch size divided by the image size determines n. Per volume pair, patches are extracted along the axial plane so that the model learns to distinguish patches within volumes. To distinguish between patches across volume pairs, patches are extracted from different volumes inferiorly or superiorly. In the example in FIG. 5, patches are extracted within pairs along the x-axis and between pairs along the y-axis. A positive pair only consists of two patches that originate from the same relative position within the scans.

Figure 6:
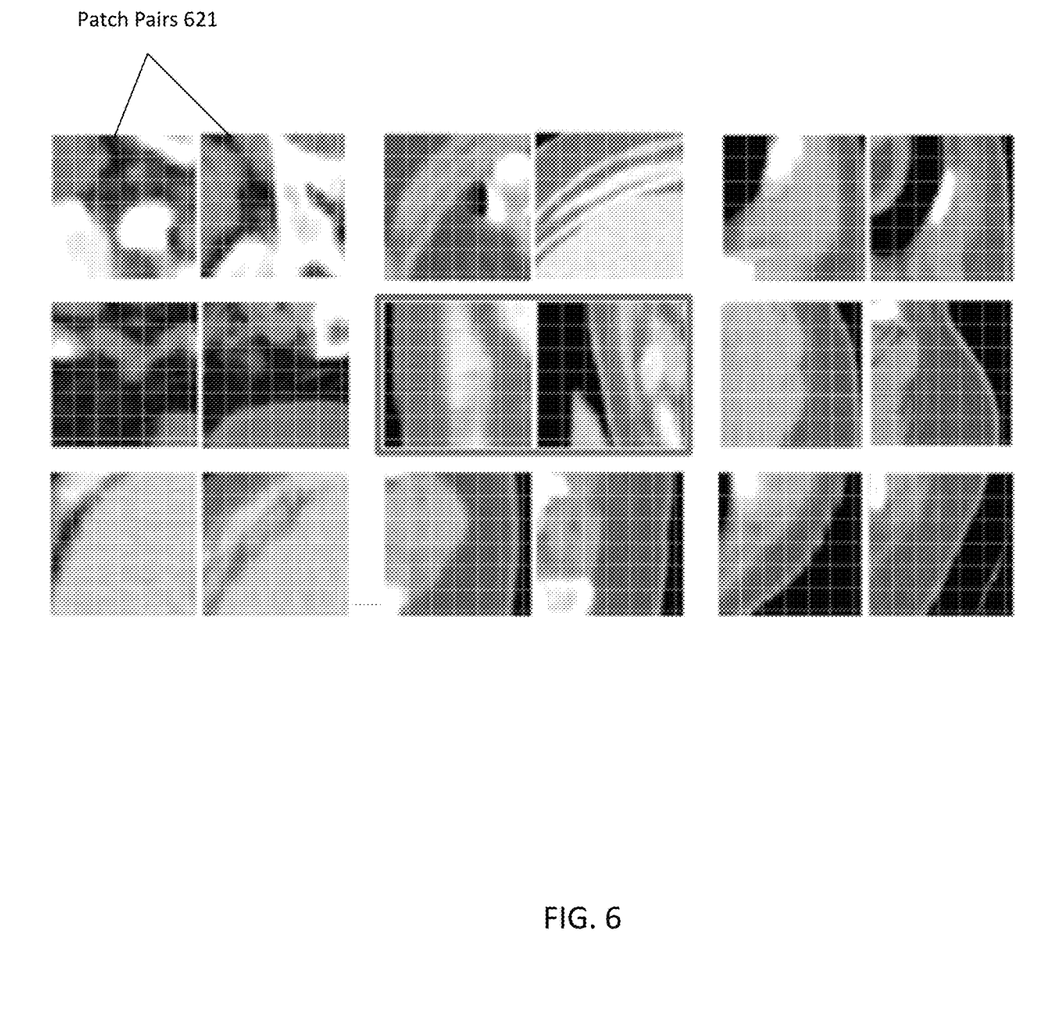
FIG. 6 depicts an example of patch extraction according to an embodiment.
Figure 7:
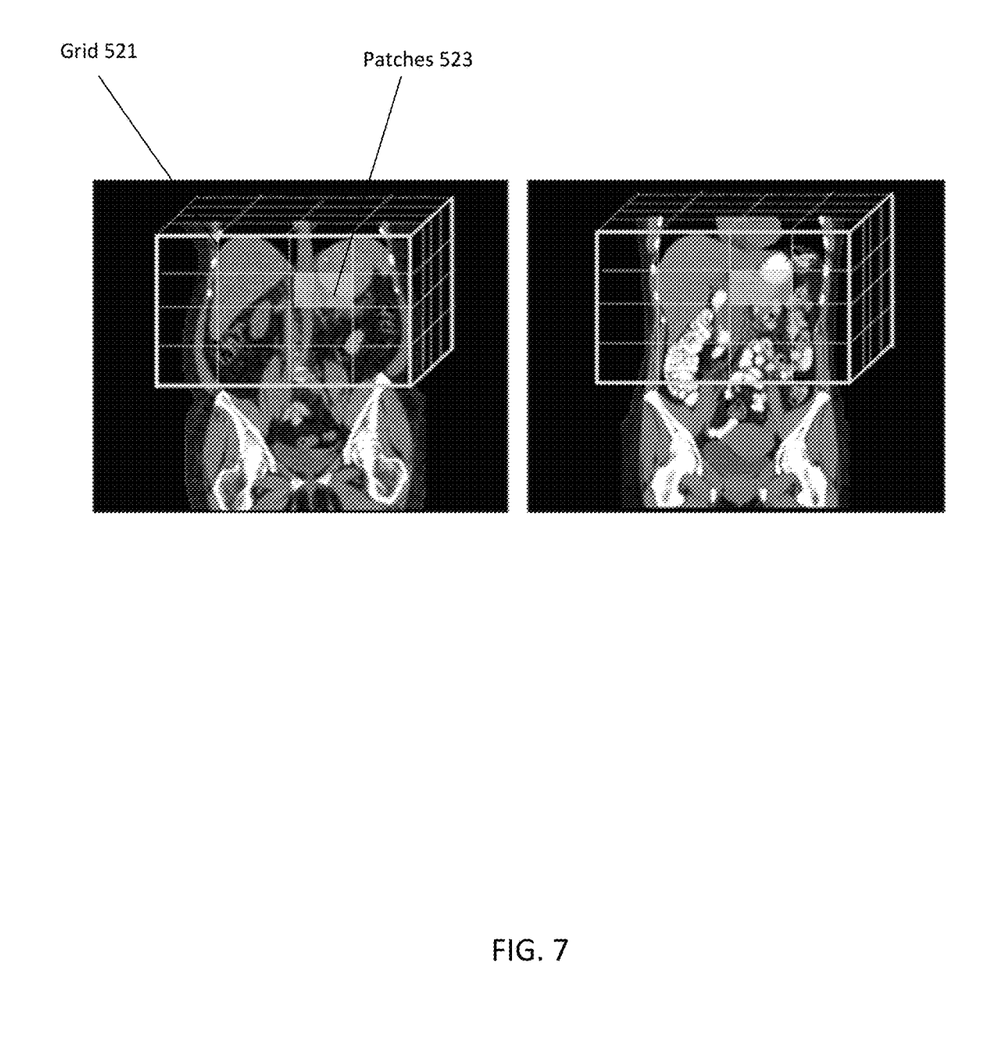
FIG. 7 depicts an example of patch extraction according to an embodiment.

FIG. 6 depicts an example of pairs of patches. FIG. 6 shows 9 patch pairs 621 in axial view. Two closely adjacent patches form a positive pair, like the one in the center frame. Two patches of a pair should be similar to each other and dissimilar to patches of other pairs. FIG. 7 depicts another example of patch extraction from a volume using a grid 521 that separates the volume into non-overlapping patches 523. FIG. 7 depicts how a 3D gride may be used to extract patches 523.

Figure 8:
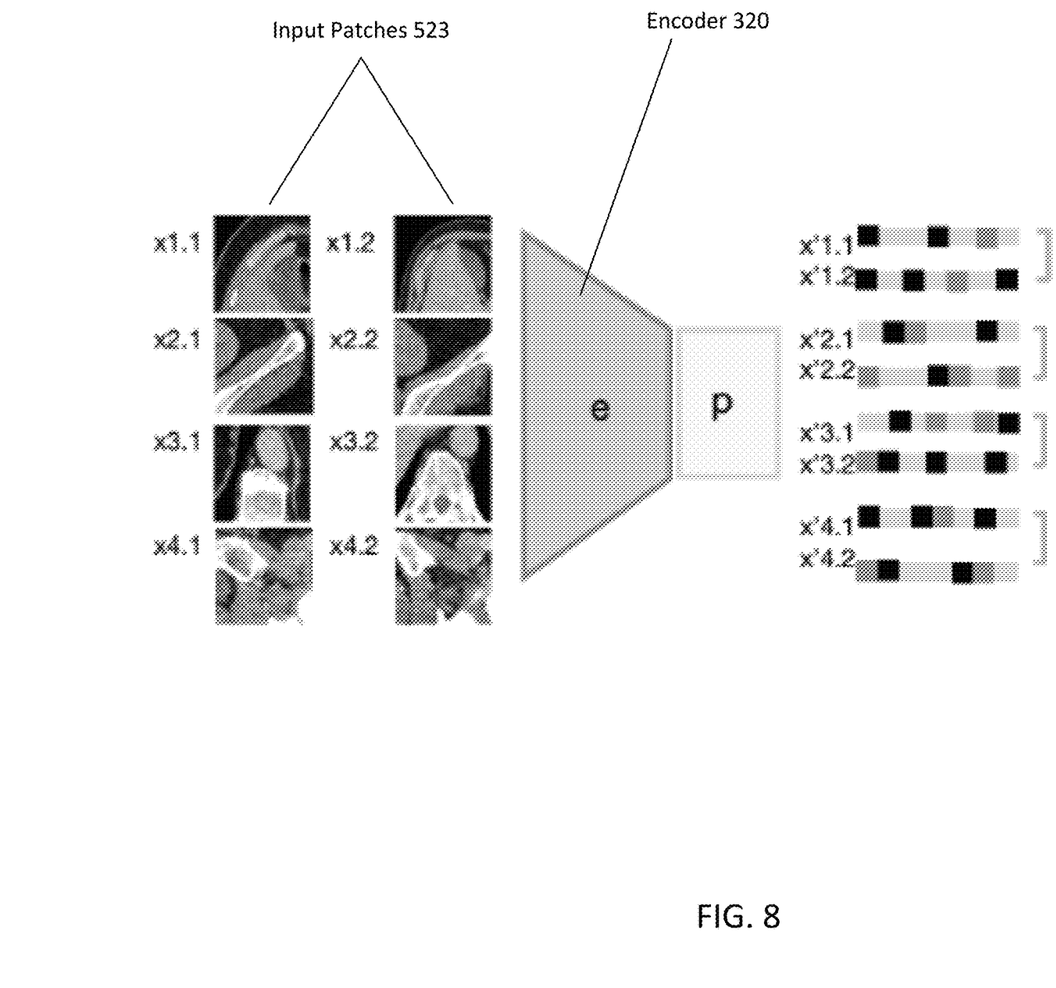
FIG. 8 depicts an example of pre training an encoder network according to an embodiment.

At act A130, the system 100 machine pretrains an encoder network of a model using a contrastive loss to distinguish patches from different positions. FIG. 8 depicts an example of the encoder 320 training. During training, two patches 523 coming from the same location (x1.1 and x1.2) are treated as a similar pair. Via a contrastive loss, the agreement between the representations (x'1.1 and x'1.2) is maximized in the latent space. All the other pairs (x2.1, x2.2; x3.1, x3.2; x4.1, x4.2), coming from different locations, are treated as dissimilar. Therefore, the agreement is minimized.

Contrastive Loss is a metric-learning loss function that operates on pairs of embeddings received from the model and on the ground-truth similarity flag—a Boolean label, specifying whether these two samples are "similar" or "dissimilar." The input is not one, but 2 images. Contrastive loss penalizes "similar" samples for being far from each other in terms of Euclidean distance (although other distance metrics could be used). "Dissimilar" samples may be penalized by being too close to each other. Margin may also be used. Margin is a minimal distance that dissimilar points need to keep. The contrastive loss may penalize dissimilar samples for beings closer than the given margin. What is learned when using a contrastive loss is defined by how positive pairs are selected. For natural images, positive pairs may be generated by transforming a single image to create different views. Unlike natural images, however, medical images share many similarities. Embodiments do not apply additional transformations and solely relies on similarities across volumes in 3D.

The encoder 320 is followed by a multilayer perceptron with two layers. This projection head is only used during pre-training and maps the encoder's 320 output to a latent space. The contrastive learning loss is applied to the latent space. The contrastive loss takes the output of the encoder 320 for a positive example and calculates its distance to an example of the same class and contrasts that with the distance to negative examples. The loss is low if positive samples are encoded to similar (closer) representations and negative examples are encoded to different (farther) representations.

Figure 9:
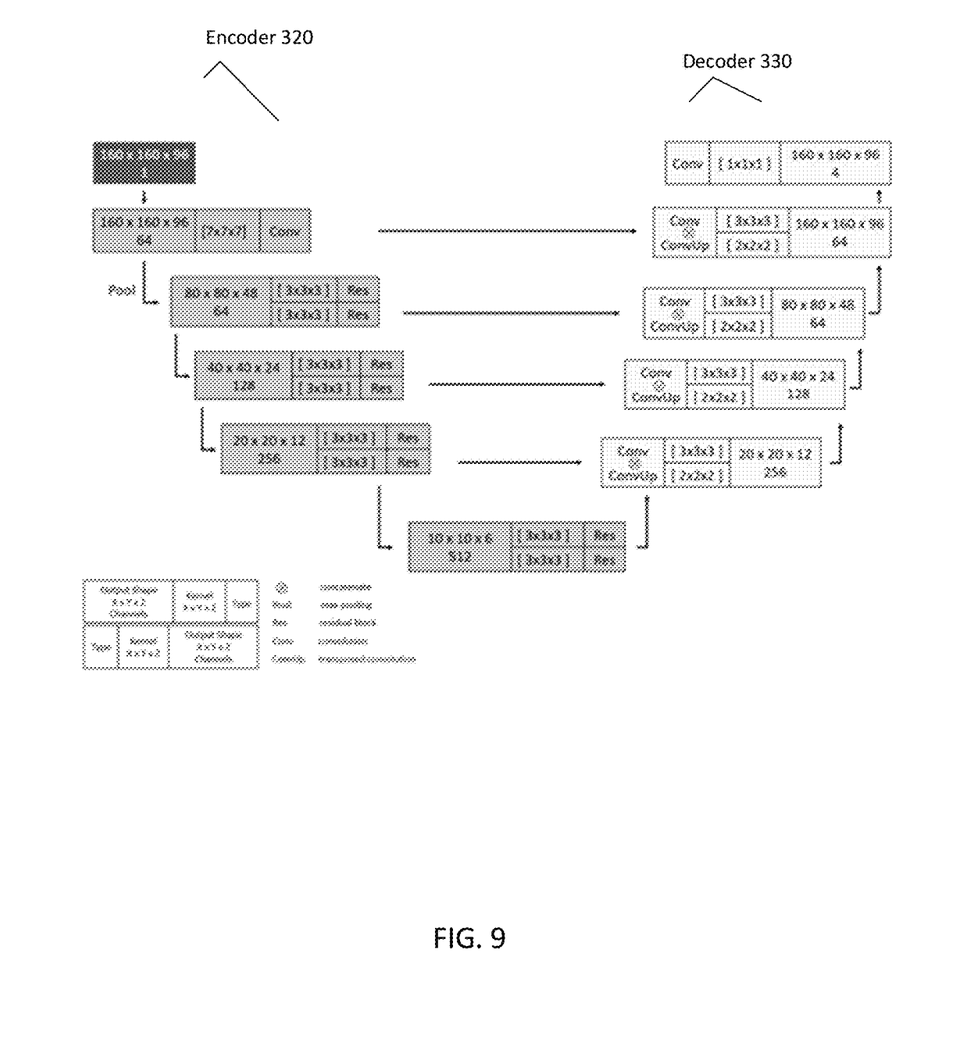
FIG. 9 depicts an example U-net architecture for a segmentation model according to an embodiment.

In an embodiment, the encoder 320 is configured as a ResNet. FIG. 9 depicts an example of an encoder decoder network with the encoder 320 shaded. In ResNet, residual blocks are used, in which shortcut connections perform identity mapping across layers. The ResNet starts with one convolution with kernel size 7×7×7, stride 1×1×1, and a padding of 3×3×3 is applied. This convolution is followed by batch norm, ReLU, and a Max pooling step with kernel size 3×3×3, stride 2×2×2, and dilation of 1. The following architecture consists of 4 layers, each with 2 residual blocks. One residual block is composed of two convolutions with 3×3×3, stride 2×2×2, and a padding of 1×1×1, each followed by batch normalization. As non-linear activation, ReLU is used after the first convolutional and batch normalization step. For each block, identity shortcut connections are inserted. All these layers are connected with a downsampling step. For downsampling, a convolutional with kernel size 1×1×1 and stride 2×2×2 is applied.

At act A140, the system 100 extends the model to include a decoder network. In the second stage, this encoder 320 is extended by a decoder and trained fully supervised using 3D CT scans and body composition labels (muscle, subcutaneous and visceral adipose tissue). This training data is smaller than the data used in the first stage as it requires manual labeling. By transferring the extracted information from the pretraining to a downstream task, the model performs better with less data compared to a randomly initialized model. The labeled CT data may be acquired in act A110 or at any point prior to training of the segmentation model.

In an embodiment, the segmentation model follows a U-net architecture such as depicted in FIG. 9. U-Net is a convolutional neural network architecture developed for biomedical image segmentation. The architecture of U-Net is inspired by fully convolutional networks and an autoencoder architecture. The segmentation model consists of a contracting path (encoder 320) and an expanding path (decoder), with skip connections between these paths. The encoder 320 consists of two 3×3 convolutional and a Max pooling operation per layer. Spatial features are extracted by reducing the spatial resolution and increasing the number of feature maps. These feature maps are used in the decoder path to build a segmentation map. The spatial resolution is increased, and the number of feature maps is decreased using up-convolutional layers. The feature maps are combined with the ones from the encoder 320 from corresponding layers via skip connections followed by two 3×3 convolutions. These skip connections allow the network to use information from the encoder 320 to localize high-level features in the decoder. In image segmentation tasks, this is particularly useful since precise localization of features is essential. FIG. 9 depicts an example of one possible encoder 320/decoder architecture. Additional architectures may be used. A convolutional or other neural network may be used. Any number of layers and nodes within layers may be used. A DenseNet, U-Net, encoder-decoder, Deep Iterative Down-Up CNN, image-to-image and/or another network may be used. Some of the network may include dense blocks (i.e., multiple layers in sequence outputting to the next layer as well as the final layer in the dense block). Any known or later developed neural network may be used. Any number of hidden layers may be provided between the input layer and output layer.

At act A150, the segmentation model is trained using fully supervised training with labeled CT data, wherein the encoder 320 weights of the model are frozen. In order to train the segmentation model, the segmentation model inputs the training data and outputs a segmented image or volume. The prediction is compared to the labeled CT data. A loss function may be used to identify the errors from the comparison. The loss function serves as a measurement of how far the current set of predictions are from the corresponding true values. Some examples of loss functions that may be used include Mean-Squared-Error, Root-Mean-Squared-Error, and Cross-entropy loss. Mean Squared Error loss, or MSE for short, is calculated as the average of the squared differences between the predicted and actual values. Root-Mean Squared Error is similarly calculated as the average of the root squared differences between the predicted and actual values. During training and over repeated iterations, the segmentation model attempts to minimize the loss function as the result of a lower error between the actual and the predicted values means the segmentation model has done a good job in learning. During training, the pretrained weights of the encoder 320 are frozen and only the weights for the decoder component of the segmentation model are changed. Different optimization algorithms may be used to minimize the loss function, such as, for example, gradient descent, Stochastic gradient descent, Batch gradient descent, Mini-Batch gradient descent, among others. The process of inputting, outputting, comparing, and adjusting is repeated for a predetermined number of iterations with the goal of minimizing the loss function.

The proposed pre-training helps to achieve better results (in terms of segmentation performance and robustness) compared to initializing the model randomly when using a small portion of the training data. Using the pre-training adds information to the model. The model using pre-trained weights is able to segment a scan with a different sex comparably well, unlike the randomly initialized model.

At act A160, the machine trained segmentation model is stored for use in segmentation applications on unseen data. In an embodiment, the model produces a segmentation mask for at least four classes: Skeletal muscle, inter- and intramuscular adipose tissue, visceral adipose tissue, and subcutaneous adipose tissue for the entire abdomen and pelvis regions. In another use, body composition quantification may be used to diagnosis or provide information for survival outcome in oncological patients. Segmentation of adipose and muscle volumes may also be valuable for creating new biomarkers of health and disease. Certain body composition markers are known to predict outcomes in major surgery. In addition, other metabolic conditions may be better diagnosed or predicted.

The machine learned network(s) and other data may be stored in a memory 120. The memory 120 may be or include an external storage device, RAM, ROM, database, and/or a local memory (e.g., solid state drive or hard drive). The same or different non-transitory computer readable media may be used for the instructions and other data. The memory 120 may be implemented using a database management system (DBMS) and residing on a memory 120, such as a hard disk, RAM, or removable media. Alternatively, the memory 120 is internal to the processor 110 (e.g., cache).

The instructions for implementing the processes, methods, and/or techniques discussed herein are provided on non-transitory computer-readable storage media or memories, such as a cache, buffer, RAM, removable media, hard drive, or other computer readable storage media (e.g., the memory 120). The instructions are executable by the processor 110 or another processor. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the instructions set, storage media, processor 110 or processing strategy and may be performed by software, hardware, integrated circuits, firmware, micro code, and the like, operating alone or in combination. In one embodiment, the instructions are stored on a removable media device for reading by local or remote systems. In other embodiments, the instructions are stored in a remote location for transfer through a computer network. In yet other embodiments, the instructions are stored within a given computer, CPU, GPU, or system. Because some of the constituent system components and method steps depicted in the accompanying figures may be implemented in software, the actual connections between the system components (or the process steps) may differ depending upon the manner in which the present embodiments are programmed.

The display 115 is configured to display or otherwise provide the model of the user to the user. The display 115 is a CRT, LCD, projector, plasma, printer, tablet, smart phone or other now known or later developed display device for displaying the output.

Figure 10:
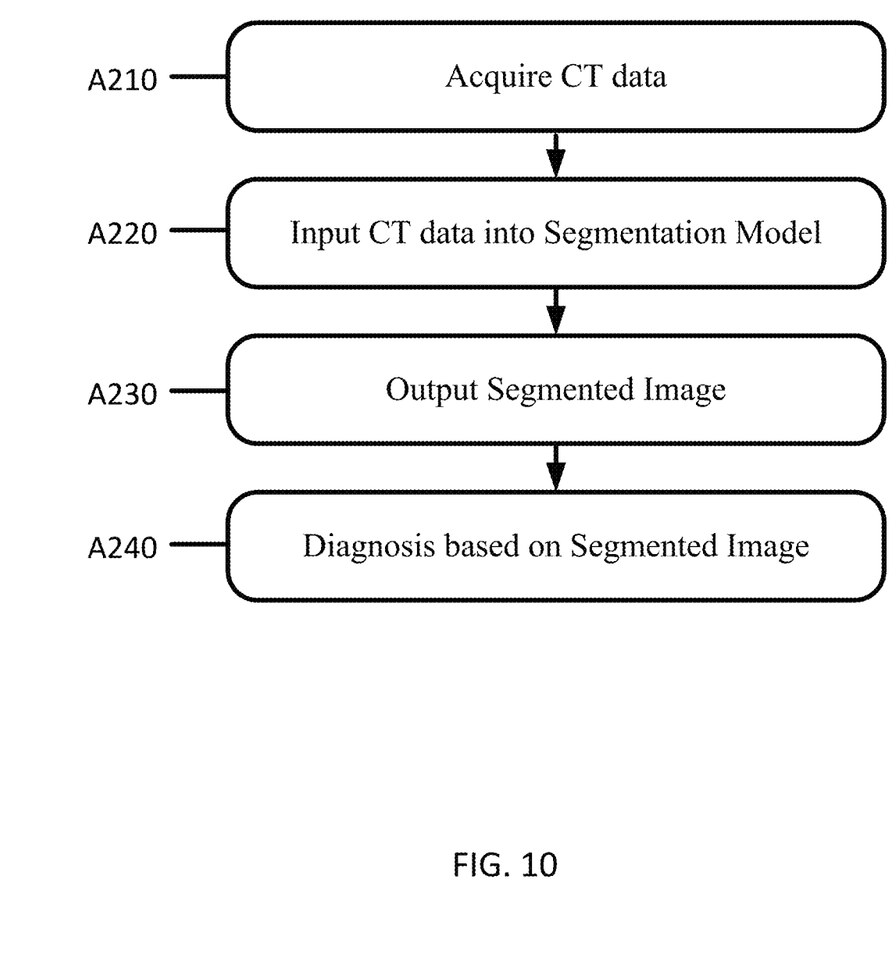
FIG. 10 depicts an example method for quantification of body composition using contrastive learning according to an embodiment.

FIG. 10 depicts an example of quantifying body composition automatically according to an embodiment. The method is performed by the system 100 of FIGS. 1, 2, or another system 100. The method is performed in the order shown or other orders. Additional, different, or fewer acts may be provided.

At act A210, a CT scan is performed on a patient. The CT scan generates CT data. The CT scan may include a plurality of image slices that when combined form a 3D volume. At act A220, the CT data is input into a segmentation model that is configured to output a segmented mask when input CT data. The segmentation model may comprise a U-net including an encoder 320/decoder architecture. The segmentation model is trained using unsupervised training and supervised training. An encoder 320 of the segmentation model is pretrained using unlabeled data. The segmentation model is then trained using the labeled data with the encoder 320 weights frozen. During the pre-training, the scans are first aligned, and patches 310 across volumes are extracted. These patches 310 are then used to extract global information via a contrastive loss. The weights trained in this process are employed in the encoder 320 of the final architecture for the segmentation task. In an embodiment, the dataset used for pre-training includes whole body and abdominal CT images from multiple patients. The scans are selected based on the field of view covering the relevant abdomen and pelvis areas to be useful for pre-training. For training the segmentation model, a body composition dataset includes abdominal and whole-body CT images from different patients. The CT images show various diseases. The body composition dataset may be split into training, validation, and testing sets. Two datasets may be used, one during pre-training (unlabeled scans) and one for the segmentation task (annotated for body composition). Only the unlabeled scans need to be aligned, paired, separated by sex. Patches are extracted only from the first dataset. The body composition dataset is annotated and used in a fully supervised learning setting using the scan+annotation as training data. The body composition dataset is annotated including at least the abdominal cavity. After a subset of scans is selected, the scans are cropped to the relevant area. After the scans are aligned, the volumes are separated by sex and randomly paired together within their group. From each pair, patches 310 are extracted from similar locations between the two volumes.

For the pre-training dataset, the CT scans need to be roughly registered first to extract similar contents across volumes. A landmark detection model is used to find scans from a large pool of data showing the relevant area covering abdomen and pelvis. With the landmark detection model, the positions of vertebral bodies are automatically determined and based on that, their presence is detected.

At act A230, the segmentation model outputs a segmented mask for the CT data for the patient. The segmented mask may distinguish between different types of tissues, organs, objects, and other structures in the acquired CT data for the patient. At act A240, a medical diagnosis is made based on the segmented mask.

It is to be understood that the elements and features recited in the appended claims may be combined in different ways to produce new claims that likewise fall within the scope of the present invention. Thus, whereas the dependent claims appended below depend on only a single independent or dependent claim, it is to be understood that these dependent claims may alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description. Independent of the grammatical term usage, individuals with male, female or other gender identities are included within the term.

The invention claimed is:

1. A method for training a segmentation model, the method comprising:
    acquiring unlabeled CT data and labeled CT data;
    extracting a plurality of patches taken from same positions across different images of the plurality of unlabeled CT data;
    pre training an encoder network of the segmentation model using the plurality of patches and a contrastive loss to distinguish respective patches from patches from different positions;
    extending the segmentation model to include a decoder network;
    training the segmentation model using fully supervised training with the plurality of labeled CT data, wherein pre trained encoder weights of the segmentation model are frozen; and
    storing the trained segmentation model for a medical segmentation task.

2. The method of claim 1, wherein the unlabeled CT data and labeled CT data comprise 3D volume data.

3. The method of claim 1, wherein extracting the plurality of patches comprises at least aligning and cropping the unlabeled CT data using a deep reinforcement learning based landmark detection method.

4. The method of claim 1, wherein the plurality of patches comprise non-overlapping sections of the unlabeled CT data with unique locations.

5. The method of claim 1, wherein the labeled CT data comprises body composition labels.

6. The method of claim 1, wherein the segmentation model is trained to segment and classify at least muscle, subcutaneous, intramuscular, and visceral fat tissue.

7. The method of claim 1, wherein an amount of labeled CT data is smaller than the unlabeled CT data.

8. The method of claim 1, wherein the segmentation model comprises a U-net architecture comprising at least the encoder network and the decoder network.

9. A system for segmentation, the system comprising:
    a CT imaging device configured to acquire CT data of a patient;
    a memory configured to store a segmentation model comprising an encoder network and a decoder network, wherein weights for the encoder network are pretrained using a contrastive loss configured to distinguish different positions of a plurality of patches from unlabeled CT data, wherein weights for the decoder network are learned by training the segmentation model using labeled CT data, wherein during training of the segmentation model, the weights for the encoder network are frozen;

a processor configured to apply the segmentation model to the CT data of the patient to output a segmented mask; and a display configured to display the segmented mask.

10. The system of claim 9, wherein the unlabeled CT data and labeled CT data comprise 3D volume data.

11. The system of claim 9, wherein pretraining of the encoder network comprises extracting the plurality of patches from the unlabeled CT data by aligning and cropping the unlabeled CT data using a deep reinforcement learning based landmark detection method, wherein pairs of the plurality of patches are input into the encoder network to generate the contrastive loss.

12. The system of claim 9, wherein the labeled CT data comprises body composition labels.

13. The system of claim 9, wherein the segmentation model is trained to segment and classify at least muscle, subcutaneous, intramuscular, and visceral fat tissue.

14. The system of claim 9, wherein an amount of labeled CT data is smaller than the unlabeled CT data.

15. A method for quantification of body composition, the method comprising:

acquiring CT data of a patient;

inputting the CT data into a segmentation model that is configured to segment input CT data, wherein the segmentation model comprises an encoder network and a decoder network, wherein weights for the encoder network are pretrained using a contrastive loss configured to distinguish different positions of a plurality of patches from unlabeled CT data, wherein weights for the decoder network are learned by training the segmentation model using labeled data, wherein during training of the segmentation model, the weights for the encoder network are frozen;

outputting a segmented image of the CT data; and diagnosis a medical condition for the patient based on the segmented image.

16. The method of claim 15, wherein the unlabeled CT data and labeled CT data comprise 3D volume data.

17. The method of claim 15, wherein the segmentation model comprises a U-net architecture comprising at least the encoder network and the decoder network.

18. The method of claim 15, wherein pretraining of the encoder network comprises extracting the plurality of patches from the unlabeled CT data by aligning and cropping the unlabeled CT data using a deep reinforcement learning based landmark detection method, wherein pairs of the plurality of patches are input into the encoder network to generate the contrastive loss.

19. The method of claim 18, wherein the plurality of patches comprise non-overlapping sections of the unlabeled CT data with unique locations.

* * * * *